United States Patent
Henry

[11] Patent Number: 5,078,170
[45] Date of Patent: Jan. 7, 1992

[54] COUPLER FOR FLUID CONDUITS

[75] Inventor: Craig A. Henry, Raleigh, N.C.

[73] Assignee: Emco Wheaton, Inc., Cary, N.C.

[21] Appl. No.: 680,401

[22] Filed: Apr. 4, 1991

[51] Int. Cl.$^5$ .............................................. F16L 37/28
[52] U.S. Cl. ............................. 137/614.06; 285/319; 285/320
[58] Field of Search ...................... 137/614.06, 614.04, 137/614.02, 614, 614.03; 285/319, 320, 921

[56] References Cited

U.S. PATENT DOCUMENTS

| | | | |
|---|---|---|---|
| 2,637,572 | 5/1953 | Bruce | 137/614.02 X |
| 2,773,706 | 12/1956 | Leavell | 137/614.06 X |
| 4,637,432 | 1/1987 | Medvick et al. | 137/614.04 X |
| 4,641,859 | 2/1987 | Walters | 285/317 X |

*Primary Examiner*—Martin P. Schwadron
*Assistant Examiner*—Kevin L. Lee
*Attorney, Agent, or Firm*—Bell, Seltzer, Park & Gibson

[57] ABSTRACT

A coupler of the dry break type includes male coupling member having an axial bore and a valve for opening and closing the bore therein, and female coupling member having an axial bore with a valve for opening and closing the bore therein and latching members for locking the male coupling member and female coupling means in coupled relation when the valves are open and for unlocking the same when the valves are closed, the latching members comprising a plurality of latching members which lock the male coupling member in coupled relation with the female coupling member and a latching sleeve which engages the latching members when the valves are open to hold the same in latched position.

6 Claims, 3 Drawing Sheets

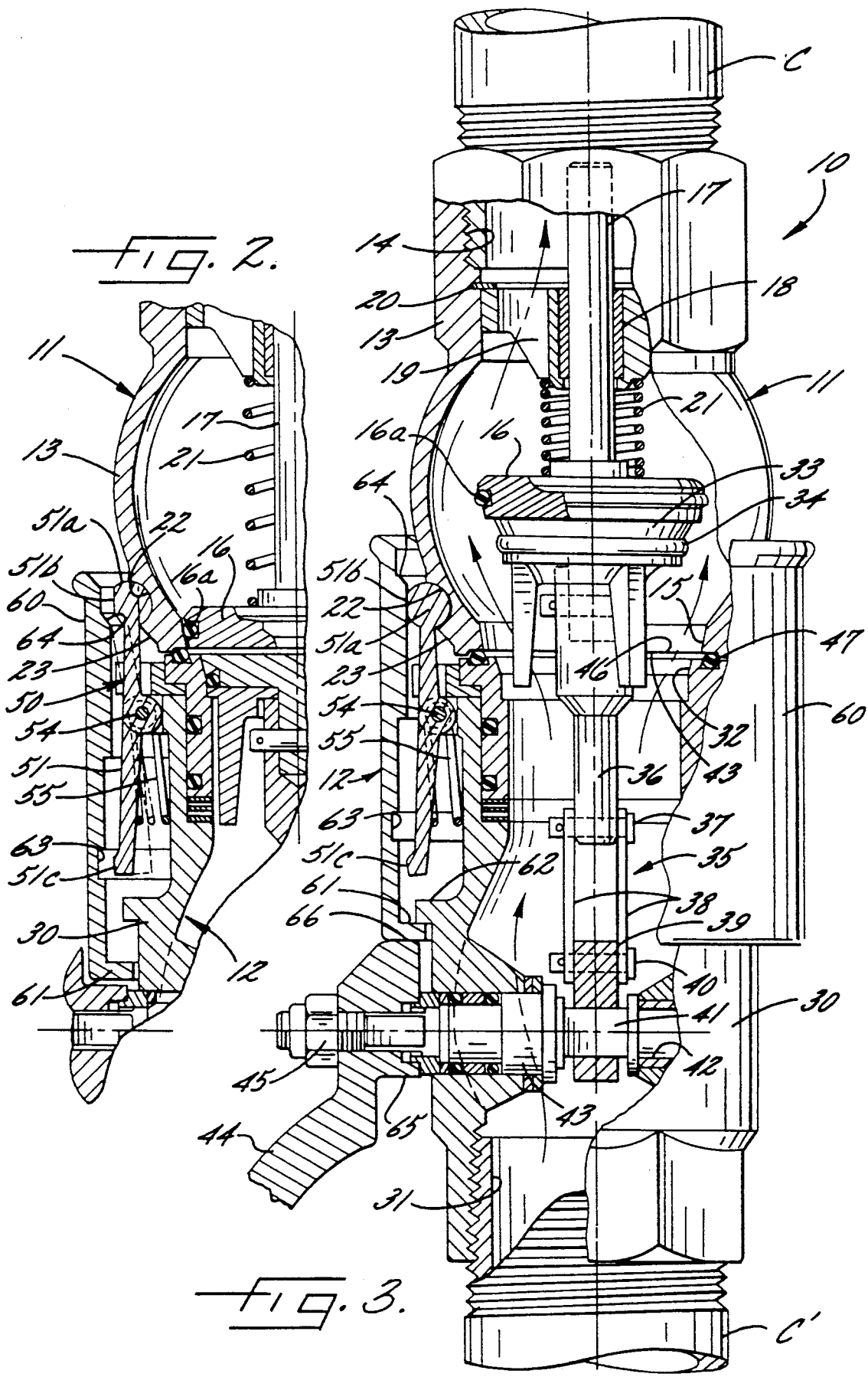

U.S. Patent  Jan. 7, 1992  Sheet 3 of 3  5,078,170
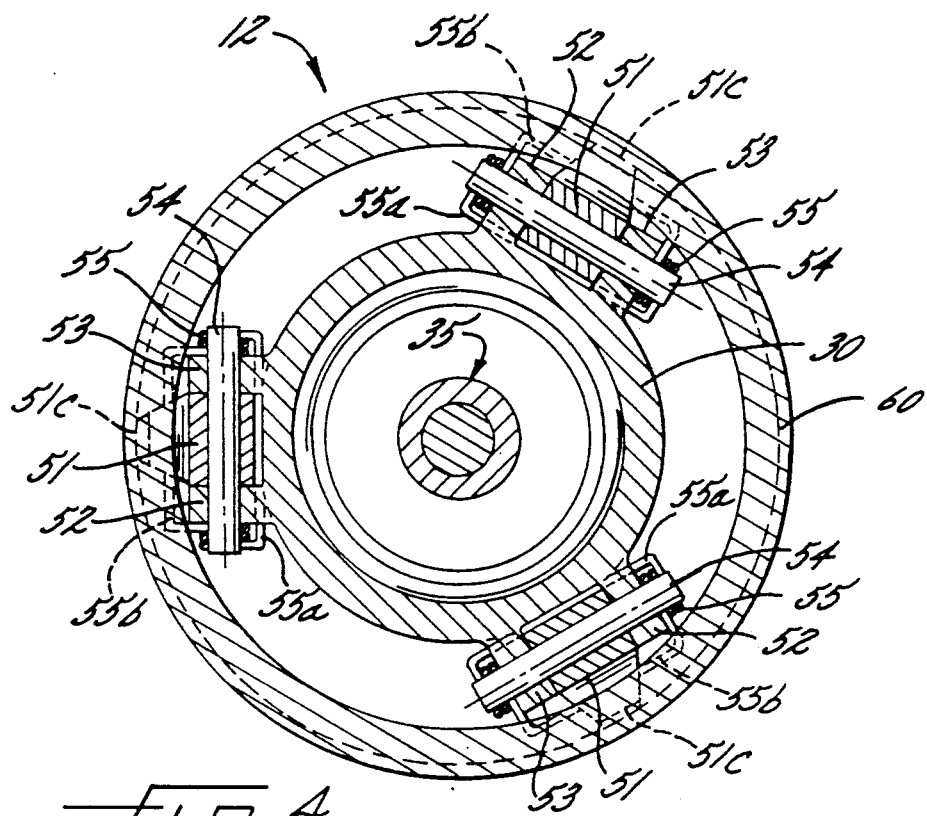
Fig. 4.
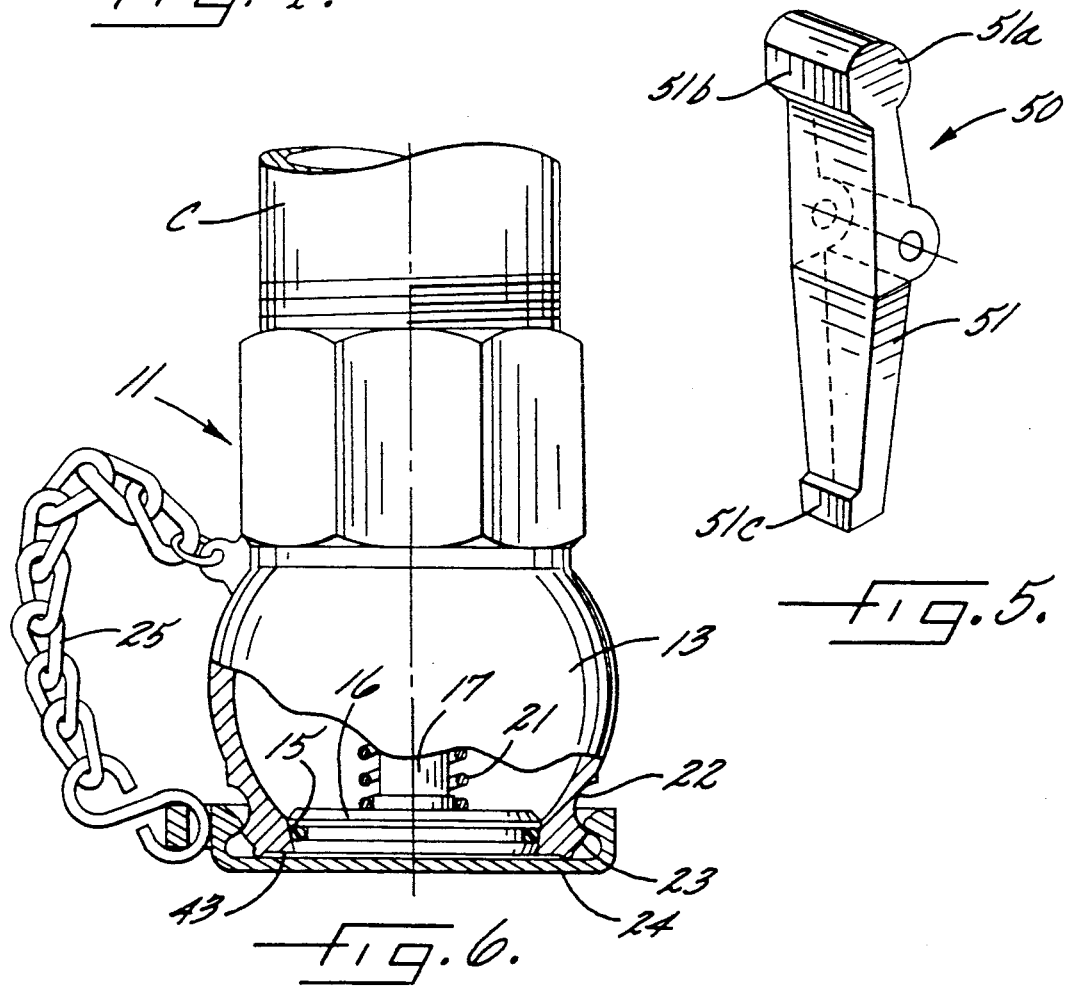
Fig. 5.
Fig. 6.

and accidental opening. Protective cap 24 is attached to the male coupling body member 13 by a chain 25 to prevent loss thereof.

COUPLER FOR FLUID CONDUITS

FIELD OF THE INVENTION

This invention relates to fluid conduits and more particularly to couplers for separably connecting or coupling two conduit sections in such a manner that leakage from the conduit sections is precluded upon disconnection or uncoupling thereof.

BACKGROUND OF THE INVENTION

Certain fluid conduits and particularly those that conduct certain liquids, pose potential environmental problems in the event of leakage therefrom. Accordingly, it is recognized that couplers for conduit sections in such fluid conduits should be capable of coupling and uncoupling such conduit sections while preventing leakage therefrom. Such couplers are frequently referred to as "dry break couplers."

It is known to provide such dry break couplers with valves which must be closed before the couplers can be disconnected and which cannot be opened until the couplers are connected. However, in such prior dry break couplers, the latch mechanisms for holding the coupler sections in coupled relationship and for preventing opening of the valves when the coupler sections are uncoupled are entirely separate and operate independently of each other. Such independent latch mechanisms are more complex and expensive and potentially troublesome. For example, such prior dry break couplers typically have a single latch member for preventing the valves to be opened when the coupler sections are uncoupled. If that single latch member should fail or be damaged, the valve could open and significant leakage occur.

With the foregoing in mind, it is an object of the present invention to provide a dry break coupler which overcomes the deficiencies of prior couplers.

It is a more specific object of the present invention to provide a dry break coupler of improved construction and operation in which the latch mechanisms for latching the coupler sections together in coupled relation and for preventing opening of the valve when the coupler sections are uncoupled are combined and operate in coordination.

SUMMARY OF THE INVENTION

The foregoing objects are accomplished by providing a dry break coupler formed of a male coupling means and a female coupling means. The male and female coupling means include valves for controlling the flow of fluid therethrough and latch means for latching the male and female coupling means in coupled relation. The female coupling means includes a locking means for preventing opening of the valve when the male and female coupling means are uncoupled and for preventing uncoupling of the male and female coupling means when the valve is open. The latch means for latching the male and female coupling means in coupled relation also latches the locking means in valve opening prevention position until the male and female coupling means are placed in coupled relation.

BRIEF DESCRIPTION OF THE DRAWINGS

FIG. 2 is a fragmentary vertical sectional view illustrating male and female coupling means of the coupler of the present invention in partial coupled relation;

FIG. 3 is an elevational view, in partial section, of the coupler of the present invention in full operative position;

FIG. 4 is a horizontal sectional view taken substantially along line 4—4 in FIG. 1;

FIG. 5 is a perspective view of one of the latch members shown in FIGS. 1-3, and FIG. 6 is an elevational view in partial section of the male coupling means shown in FIGS. 2 and 3.

DETAILED DESCRIPTION OF THE PREFERRED EMBODIMENT

Figure 1:
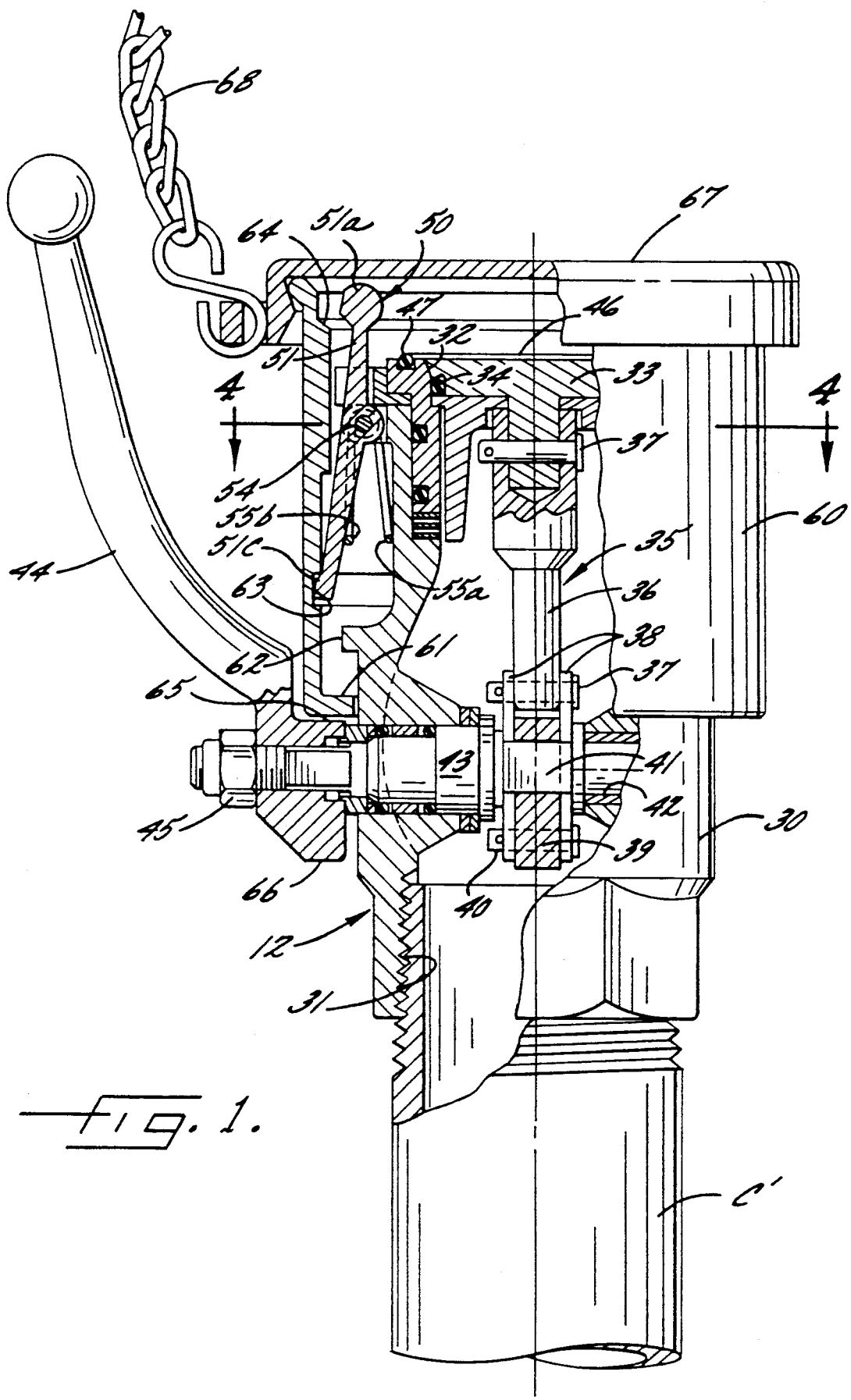
FIG. 1 is an elevational view, partially in section, of the female coupling means of a coupler embodying the features of the present invention.

Referring more particularly to the drawings, there is shown a coupler generally indicated at 10 incorporating the features of the present invention. Coupler 10 is of the so-called "dry break" type and is specifically constructed so as to be locked in coupled relation when liquid or other fluids are flowing therethrough and to be closed to prevent leakage before uncoupling thereof can be effected.

Coupler 10 includes male coupling means generally indicated at 11 (FIGS. 2, 3 and 6) and female coupling means 12 (FIGS. 1-3). Male coupling means 11 comprises a body member 13 having an axial bore extending therethrough for the flow of liquid or other fluids through male coupling 11. Male coupling body member 13 has an internally threaded portion 14 at the upper end thereof for connection of the male coupling means 11 to a conduit section C.

The axial bore extending through male coupling body member 13 preferably has an expanded generally spheroidal section adjacent the lower end thereof. Male coupling body member 13 has a valve seat 15 at the lower end of the axial bore therethrough. Valve seat 15 cooperates with a valve member 16 mounted within the spheroidal bore section of male coupling body member 13 for movement toward and away from valve seat 15. An O-ring seal 16a is carried by the valve member 16 for sealing engagement with valve seat 15. Valve member 16 is carried by the lower end of a valve mounting member 17 which is illustrated as a cylindrical rod. Valve mounting member 17 is in turn mounted for reciprocating movement in a sleeve bearing 18 mounted in a spider 19. Spider 19 is held in the axial bore through male coupling body member 13 by a lock washer 20.

A compression spring 21 is disposed between valve member 16 and the lower side of the spider 19 to bias the valve member 16 toward valve seat 15. Valve member 16 is thereby mounted for reciprocal movement toward and away from the valve seat 15 to open and close the bore through male coupling body member 13 in a manner to be described hereinafter.

Male coupling body member 13 has an external circumferential locking groove 22 in the lower end portion thereof. The exterior surface of the lower end portion of male coupling body member 13 below the locking groove 22 forms a cam surface 23 for reasons to be described hereinafter. A removable protective cap 24 snaps over the lower end of male coupling body member 13 when male coupling means 11 is in uncoupled relation to protect the valve member 16 from damage or accidental opening. Protective cap 24 is attached to the male coupling body member 13 by a chain 25 to prevent loss thereof.

Female coupling means 12 comprises a body member 30 having an axial bore therethrough to provide for the flow of liquid or other fluids therethrough. Body member 30 of the female coupling means 12 has an internally threaded portion 31 at one end thereof for receipt of an externally threaded end portion of a conduit section C' to connect the female coupling means 12 to the conduit C'.

Body member 30 of female coupling means 12 includes a valve seat 32 (FIG. 3) in its upper end portion which cooperates with a valve member 33 having a suitable O-ring seal 34 around the outer periphery thereof for sealing against the valve seat 32. Valve member 33 is carried by a linkage mechanism 35 comprising a first linkage member 36 that is connected at its upper end to valve member 33 by a connecting pin 37. First linkage member 36 is pivotally connected by a pivot pin 37 to a second linkage member 38 at its other end. Second linkage member 38 is in turn connected to the outer end of a crank arm 39 by a suitable pivot pin 40. Crank arm 39 is mounted on a shaft 41 for rotation therewith. Shaft 41 is journalled in suitable bearings 42, 43 at spaced locations in female coupling body member 30 and has an actuating member 44 mounted on its outer end, as by having the outer end of the shaft threaded and a lock nut 45 thereon.

As shown in FIG. 1, with the actuating member 44 in its uppermost position, the crank member 39 will be lowered to pull downwardly on the linkage means 35 to close valve member 33 against valve seat 32. The bore through female coupling body member 30 will thus be closed to prevent the flow of any liquid from conduit C' through the female coupling means 12. When actuating member 44 is rotated to its lowermost position, as shown in FIG. 3, the crank member 39, through the linkage members 35 and 38, will raise the valve member 33 to its open position to permit the flow of liquid through the female coupling means 12.

The body member 30 of female coupling means 12 has a sealing surface 46 on its upper end in which is mounted an O-ring 47. The sealing surface 46 and O-ring 47 cooperate with the lower end portion of the male coupling body member 11 which has a sealing surface 43 thereon. Sealing surface 43 is adapted to engage against the O-ring 47 and to thereby provide a fluid-tight seal between the male and female coupling means 11 and 12 which prevents leakage of liquid or other fluids from between the coupling means 11 and 12 when they are in coupled relation.

Female coupling means 12 includes locking means 50 for locking male coupling means 11 in coupled relation with female coupling means 12. Locking means 50 includes a plurality of latching members 51 mounted on female coupling body member 30 in circumferentially spaced relation around the periphery thereof. Female coupling body member 30 has spaced pairs of mounting lug members 52, 53 (FIG. 4) at spaced locations around its periphery, and the latching members 51 are pivotally mounted between those pairs of mounting lug members 52, 53 by pivot pins 54. Preferably, there are three latching members 51 and a corresponding number of pairs of mounting lug members 52, 53.

A torsion spring 55 is mounted on opposite ends of each of the pivot pins 54 and has a pair of descending leg members 55a and 55b. Leg member 55a of each spring 55 engages against the female coupling body member 30 at its lower end and leg 55b engages against the lower end portion of latching member 51 at its lower end. In this manner, latching members 51 are biased about pivot pins 54 toward the locked position.

Latching members 51 have enlarged cylindrical portions 51a at their upper end, the radius of curvature of which corresponds to the radius of locking groove 22 in male coupling body member 13. Cylindrical portions 51a have flattened areas 51b on the outer surfaces thereof for purposes to be presently described. Latching members 51 have latching lugs 51c on the outer surface of the lower ends of the latching members.

Female coupling means 12 includes a latching sleeve 60 mounted on body member 30 for sliding vertical movement relative thereto. Latching sleeve 60 has an inwardly extending circumferential stop flange 61 at its lower end. Female coupling body member 30 has an external stop flange 62 thereon for limiting the upward movement of the latching sleeve 60. Latching sleeve 60 also has an inwardly opening, circumferential groove 63 on the inside surface thereof and spaced a predetermined distance upwardly from the movement limiting stop flange 61 and at a position relative to the lower ends of latching members 51 so that groove 63 is adapted to receive the outwardly extending lugs 51c of the latching members 51 when latching sleeve 60 is in its lowermost position. When male coupling means 11 is removed from female coupling means 12 and the latching members 51 are biased to their inwardmost positions, the sleeve latching lugs 51c will contact the inner surface of the groove 63 and will lock the latching sleeve 60 against any vertical movement relative to the female coupling body member 30, as is shown in FIG. 1.

Latching sleeve 60 has an inwardly extending cam surface 64 on the upper portion thereof, but spaced downwardly from the upper end of the locking sleeve by a distance such that when the latching sleeve 60 is in its lowermost position, the cam surface 64 will be below the cylindrical upper end portions 51a of the latch members 51 so that the upper end portions 51a of the latching members 51 may be moved outwardly without contacting the cam surface 64 (FIGS. 2). When the male coupling means 11 is in coupled relation with the female coupling means 12, the sleeve locking lugs 51c will be removed from the groove 63 and the latching sleeve 60 may be moved upwardly to its locking position, as is shown in FIG. 3.

The valve actuating member 44 has a recessed portion 65 on one side thereof and an outwardly protruding portion 66 on the other side thereof. When the valve actuating member 44 is in its uppermost position with the valve closed, the recessed portion 65 permits the latching sleeve 60 to be moved downwardly out of locking engagement with the latching members 51. With the valve actuating member 44 rotated to the lower, operative position to open the valve, the outwardly protruding portion 66 engages the bottom stop flange 61 of the latching sleeve and prevents the latching sleeve 60 from being moved downwardly, and the male coupling means being uncoupled, so long as the valves are open (FIG. 3). Of course, with latching sleeve 60 locked in the upper, valve closed position, the latching sleeve 60 and protruding portion 66 prevent the valve activating member 44 from being moved to the lower, valve open position. Accordingly, the valves cannot be opened when the sleeve 60 is not in its upper, locked position.

A removable cap 67 closes the upper end of the female coupling means 12 when the male coupling means 11 is out of coupling relation with female coupling means 12. A chain 68 connects the cap 67 to the female coupling body member 30 in a manner not shown.

In operation, when it is desired to couple male coupling means 11 and female coupling means 12, the removable caps 24 and 67 are removed from the lower end of male coupling means 11 and from the upper end of female coupling means 12. Male coupling means 11 is then inserted into the upper end of female coupling means 12. The cam surface 23 on the lower end portion of male coupling body member 13 engages and cams the cylindrical portions 51a of latching members 51 outwardly and moves latching members 51 in a counter-clockwise direction as seen in FIGS. 1, 2 and 3 about the pivot pins 54. The recessed portion at the upper end of the latching sleeve 60 permits the cylindrical portions 51a of the latching members 51 to be moved outwardly a sufficient distance to clear the cam surface 23 on the male coupling body member 13 and to snap into the locking groove 22 on the lower end portion of the male coupling body member 13 (FIG. 2).

The outward pivoting of the latching members 51 by the cam surface 23 on male coupling body member 13 removes the locking lugs 51c at the lower ends of the latching members 51 from the groove 63 on the interior surface of the latching sleeve 60. Latching sleeve 60 may then be moved upwardly until the cam surface 64 thereon engages the flattened areas 51b on the upper end portions 51a of latching members 51 to lock the cylindrical end portions 51a of latching members 51 in locking engagement with the locking groove 22 of the male coupling means 11 (FIG. 3).

With the latching sleeve 60 in the uppermost position, the valve actuating member 44 may then be rotated to the lower, operative position as shown in FIG. 3. Rotation of the valve actuating member 44 rotates the shaft 41 and moves the crank arm 39 upwardly. Upward movement of the crank arm 39 moves the valve member 33 through links 36 and 38 to the upper, open position shown in FIG. 3. Movement of the valve member 33 upwardly causes valve member 33 to engage valve member 16 in male coupling means 11. Further upward movement of the valve member 33 moves valve member 16 against the action of compression spring 21 to its upper, open position.

It is noted that the protruding portion 66 on the valve actuating member 44 prevents the latching sleeve 60 from being moved downwardly while the valve members 33 and 16 are in their upper, open positions. Uncoupling of male coupling means 11 and female coupling means 12 is thereby prevented while a liquid or other fluid is flowing therethrough.

When it is desired to uncouple male coupling means 11 and female coupling means 12, the valve actuating member 44 is rotated to the inoperative position (as shown in FIG. 1) which closes valve member 33 in female coupling means 12 and permits the compression spring 21 to close valve member 16 in male coupling means 11. The recessed portion 65 on valve actuating member 44 then permits the latching sleeve 60 to be moved downwardly out of engagement with the latching members 51. Male coupling means 11 may then be withdrawn from coupled relation with female coupling means 12 without any liquid or other fluid leaking therefrom. Once the male coupling means 11 and female coupling means 12 are in uncoupled relation, the removable cap 67 may be replaced on the upper end of female coupling means 12 and the removable cap 24 may be replaced on the lower end of male coupling means 11.

In the drawings and specification there has been disclosed a typical preferred embodiment and, although specific terms are employed, they are used in a generic and descriptive sense only and not for purposes of limitation, the scope of the invention being set forth in the following claims.

That which is claimed is:

1. A coupler for connecting and disconnecting conduits for fluids characterized by increased safety in both assembled and disassembled positions, said coupler comprising male coupling means having an axial bore therethrough for the flow of fluid therethrough into a conduit section, said male coupling means including latch receiving means at the other end thereof for assisting in latching the coupler in assembled position, and female coupling means having an axial bore therethrough for the flow of fluid through said female coupling means into said male coupling means, said female coupling means comprising latching means for receiving the end portion of said male coupling means having said latch receiving means therein and for latching said male and female coupling means in coupled relation, said latching means comprising a plurality of latching fingers mounted for pivotal movement intermediate the ends and having coupler latching portions at one end thereof for receipt by said latch receiving means on said male coupling means and sleeve locking portions at the other ends thereof, latching sleeve means mounted in surrounding relation to said latching fingers, said latching sleeve means being mounted for sliding movement between an extended, latching position and a retracted unlocked position, said latching sleeve means including cam means for engaging said coupler latching portions of said latching fingers upon movement of said latching sleeve means to the extended latching position for camming said latching fingers into latching engagement with said latch receiving means on said male coupling means to lock said male coupling means into coupled relation with said female coupling means, said latching sleeve means having means thereon for receiving said sleeve locking portions of said latching fingers upon movement of said latching sleeve means to the retracted unlocked position and upon removal of said male coupling means from said female coupling means for locking said latching sleeve means in the retracted unlocked position when said male coupling means is removed from said female coupling means.

2. A coupler as defined in claim 1 wherein said female coupling means further comprises valve means mounted in the bore through said female coupling means for controlling the flow of fluid through said bore, valve actuating means for opening and closing said valve means, and means mounted on said valve actuating means and cooperating with said latching sleeve means for preventing movement of said valve actuating means to open said valve means when said latching sleeve means is in the retracted, unlocked position and for preventing movement of said latching sleeve means from the extended, locking position to the retracted, unlocked position when said valve means is open.

3. A coupler as defined in claim 1 wherein said male coupling means further comprises valve means mounted in said bore for opening said bore upon opening of said valve means in said female coupling means and for closing said bore upon closing of said valve means in said female coupling means.

4. A coupler as defined in claim 1 wherein said latch receiving means on said male coupling means comprises a circumferential groove around said second end portion of said male coupling means and said coupler latching portions of said latching fingers of said female coupling means are shaped to be received in said circumferential groove and thereby cooperate with said groove to prevent removal of said male coupling means from said female coupling means until said coupler latching portions are removed from said groove.

5. A coupler as defined in claim 1 wherein said latch receiving means on said latching sleeve means comprises an inwardly facing, circumferential groove for receiving said sleeve locking portions of said latching fingers.

6. A coupler as defined in claim 1 wherein said female coupling means further comprises means biasing said latching fingers toward the latched positions and wherein said male coupling means includes cam means for moving said latching fingers upon insertion of said male coupling means into said female coupling means to retract said sleeve locking portions thereof from said latch receiving means on said latching sleeve means to unlock said latching sleeve means to permit said latching sleeve means to be moved to the extended, locking position.

* * * * *